(12) United States Patent
Zollinger et al.

(10) Patent No.: US 6,273,988 B1
(45) Date of Patent: Aug. 14, 2001

(54) METHOD FOR WELDING PLASTIC MEMBERS

(76) Inventors: Rolf A. Zollinger, 710 Carriage Dr., Atlanta, GA (US) 30328; John T. Rodney, 371 Shyrewood Dr., Lawrenceville, GA (US) 30243

(*) Notice: Subject to any disclaimer, the term of this patent is extended or adjusted under 35 U.S.C. 154(b) by 0 days.

(21) Appl. No.: 09/651,827

(22) Filed: Aug. 30, 2000

Related U.S. Application Data (62) Division of application No. 09/094,130, filed on Jun. 9, 1998, now Pat. No. 6,119,752.

(51) Int. Cl.[7] ................................................ B29C 65/20
(52) U.S. Cl. ................................. 156/304.2; 156/304.6; 156/499
(58) Field of Search .......................... 156/304.1, 304.2, 156/304.5, 304.6, 309.9, 499, 580, 581, 583.1

(56) References Cited

U.S. PATENT DOCUMENTS

| | | | |
|---|---|---|---|
| 4,752,350 | 6/1988 | Schuster | 156/379.6 |
| 4,909,892 | 3/1990 | Quinn et al. | 156/499 |
| 4,960,478 | 10/1990 | Newkirk et al. | 156/228 |
| 4,963,219 | 10/1990 | Nichols et al. | 156/304.2 |
| 4,963,421 | 10/1990 | Dickinson | 428/36.9 |
| 4,971,639 | 11/1990 | Quinn et al. | 156/64 |
| 4,995,935 | 2/1991 | Ganzberger | 156/499 |
| 5,397,425 | 3/1995 | Ivansons et al. | 156/503 |
| 5,421,944 | 6/1995 | Davis et al. | 156/304.2 |
| 5,439,546 | 8/1995 | Brickenstein | 156/304.2 |
| 5,464,496 | 11/1995 | Wilson et al. | 156/499 |
| 5,527,406 | 6/1996 | Brath | 156/64 |
| 5,584,960 | 12/1996 | Hunter et al. | 156/389 |
| 5,855,720 | 1/1999 | Johnson et al. | 156/272.2 |
| 6,056,033 | * 5/2000 | Schwaiger | 156/499 |
| 6,117,265 | * 9/2000 | Cittadini et al. | 156/258 |
| 6,119,752 | * 9/2000 | Zollinger et al. | 156/499 |
| 6,129,805 | * 10/2000 | Valentin | 156/304.2 |

OTHER PUBLICATIONS

ATCO Automated Window Machinery (Innovative and Affordable Production Machinery) brochure (undated).
SIGMA 4000 brochure (undated).
Automatic Synchro–Welder (undated).
The Horizontal Double Line advertisement, Sturtz Machinery Inc., 3050 Aurora Road, Solon Ohio 44139 (undated).
Someco 940–NH flyer, Unival SRL–47827 Villa Verucchio (RN).

* cited by examiner

Primary Examiner—James Sells
(74) Attorney, Agent, or Firm—Baker, Donelson, Bearman & Caldwell (57) ABSTRACT

A method of welding a pair of plastic members while reducing the excess or waste plastic bead on the exterior of the weld joint. A tool with opposing lower and upper dies and opposing lower and upper plates disposed in spaced-apart relation to the lower die and the upper die, respectively. The dies and plates define opposing profile surfaces that conform to an exterior cross-sectional profile of a plastic member for being received and held therebetween. Movable mount means connects the lower plate to the lower die and the upper plate to the upper die independently for lateral movement of the plates relative to the dies between a first distally spaced position to a second closely spaced position. During the welding process, the plates move laterally between the first position and the second position to seal the weld material that melts from the distal ends of the members from flowing to the exterior of the joint being formed between the plastic members. The plates seal the exterior profile and force the weld material to flow inwardly of the joint. An apparatus using two of the tools is disclosed together.

8 Claims, 5 Drawing Sheets

METHOD FOR WELDING PLASTIC MEMBERS

This application is a divisional application of co-pending application Ser. No. 09/094,130, filed Jun. 9, 1998, issued as U.S. Pat. No. 6,119,752.

TECHNICAL FIELD

The present invention relates to apparatus and methods for butt welding plastic members. More particularly, the present invention relates to tools and methods that hold plastic members for welding together while reducing the waste flow of melted plastic on the exterior of welded joints of plastic members.

BACKGROUND OF THE INVENTION

Conventional doors and windows for buildings are typically manufactured with rectangular frames which hold the door or the glass. The frames assemble from elongate members joined at distal ends. The members are known in the art as profiles. Typically the members used for windows are made from thermo-plastic materials such as extruded polyvinyl chloride and the like. The members have distal ends which define mating 45 degree angles which when joined together form a perpendicular angle for squaring a corner of the window or door frame. Frame members made from non-thermo-plastic materials, such as aluminum, have mechanical linkages which join the pair of frame members together. However, members made with thermoplastic materials are generally joined to each other by butt welding the adjacent ends with heat.

There are existing two-head or four-head welding machines of various designs for the purpose of butt welding thermo-plastic members and forming the frame. In these devices, the members are securely clamped with special tools that attach to the machines. Each tool includes a lower support on which the lower surface of the member sits. An upper support in the tool moves vertically against the upper surface of the plastic member, thereby clamping the member in the tool. Adjacent pairs of tools then move towards each other to press distal ends of the aligned members against a heat plate for melting the distal ends of the aligned members. After a period of time, the heat plate is removed, and the tools brought together to engage the distal (now molten) ends of the members which weld or fuse together. During the welding process, melted plastic material flows around the joint.

More particularly explained, the melted plastic from the aligned ends of the members flows both outwardly and inwardly of the joint formed by the welding process. The waste material forms a plastic weld bead on the exterior and interior surfaces of the welded members. The waste bead on the interior of the welded members is not objectionable in that it strengthens the weld by providing additional thickness across the joint. However, the plastic weld bead on the exterior is unsightly for ornamental purposes as well as perhaps interfering with figment of the window or door. Machinery however is provided to trim the waste bead from the weld joints. The joined members are placed on the machine and are passed by a blade that trims the waste bead from the exterior surfaces of the joint.

While the welding machinery described above readily joins thermo-plastic members together to form frames for windows and doors, the resulting frame incurs the additional labor and costs to trim the waste bead. The separate machine must be purchased and placed in the manufacturing process for deburring the joint, that is, trimming the waste bead from the welded joint. An operator is required to handle the frames for deburring the corners of the frame.

Accordingly, there is a need in the art for an improved tool for welding plastic members which reduces the waste material on the exterior of joints formed during the welding process. It is to such that the present invention is directed.

SUMMARY OF THE INVENTION

The present invention meets the need in the art by providing a tool for welding plastic members which reduces the waste material on the exterior of the joint formed during the welding process. The tool holds a plastic member for welding to a second plastic member held by a second of said tools. The tool operates during the welding process to reduce the waste material on the exterior surface of the joint formed between the plastic members. The tool comprises opposing lower and upper dies that define opposing profile surfaces that conform to an exterior cross-sectional profile of a plastic member for being received and held therebetween. Opposing lower and upper plates are disposed in spaced-apart relation to the lower die and the upper die, respectively. The plates defines opposing surfaces that conform to the exterior cross-sectional profile of the plastic member for being received therebetween. Movable mount means connects the lower plate to the lower die and the upper plate to the upper die independently for lateral movement of the plates relative to the dies between a first distally spaced position to a second closely spaced position. During the welding process, the plates move laterally between the first position and the second position. The plates seal the weld material from flowing to the exterior of the joint being formed between the plastic members and forces the weld material to flow inwardly of the joint.

Two of the tools mount in an apparatus for butt welding two plastic members that from one corner in a frame. (Typically the apparatus has two or four heads, each with two tools, for simultaneous welding of two or four corners of the frame.) The present invention provides a method of welding a pair of plastic members while reducing the excess plastic on the exterior of the weld joint. The method places a pair of plastic members in respective tools which each have opposing lower and upper dies that define opposing member surfaces that conform to an exterior cross-sectional member of the plastic member received and held therebetween. The tools further include opposing lower and upper plates disposed in spaced-apart relation to the lower die and the upper die, respectively, which plates having opposing surfaces that conform to the exterior cross-sectional member of the plastic member for being received therebetween. Movable mount means connect the lower plate to the lower die and the upper plate to the upper die independently for lateral movement of the plates relative to the dies between a first distally spaced position to a second closely spaced position during the welding process. With the plastic members held between the dies and the plates, a heat blade moves between the tools. The tools move against the sides of the heat blade for melting the distal ends of the plastic members in contact therewith. As the distal ends melt, the plates seal the exterior of the plastic members from flow of molten plastic by moving the plates in contact with the heat blade laterally towards the dies as the distal ends of the aligned plastic members melt. After suitable melting, the tools move away from the heat blade. The plates move from the second position to the first position relative to the respective dies to maintain the seal against flow of molten plastic to the exterior of the plastic members. The heat blade retracts. The tools are then moved together forcibly to move the plates laterally to the second position while the melted distal ends of the plastic members compressingly fuse together.

Objects, advantages and features of the present invention will become apparent from a reading of the following detailed description of the invention and claims in view of the appended drawings.

DETAILED DESCRIPTION OF THE PREFERRED EMBODIMENTS

Figure 1:
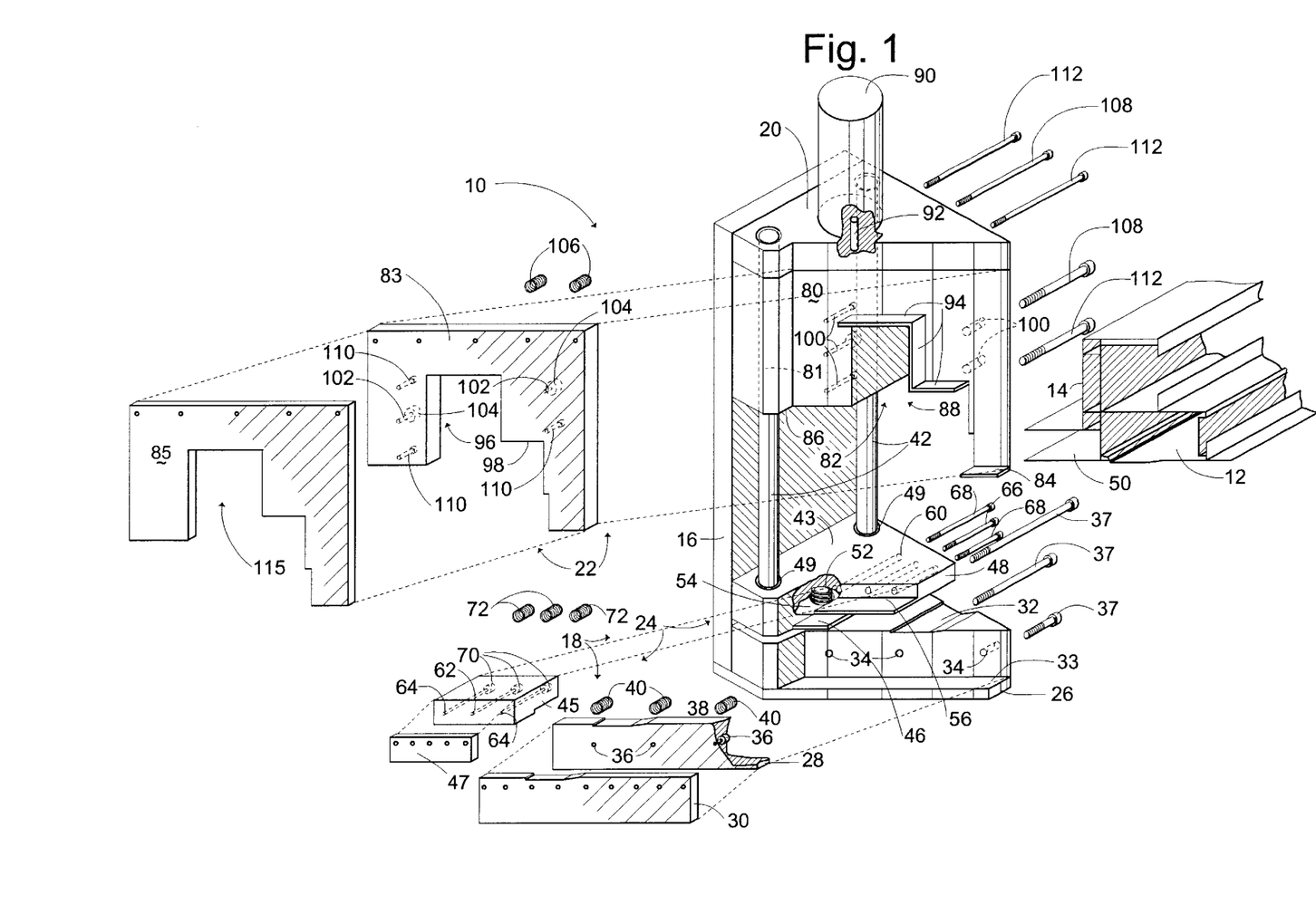
FIG. 1 illustrates in perspective view a tool that holds a plastic member for butt welding to a second plastic member while reducing the waste plastic on an exterior of a weld joint between the plastic members, according to the present invention.

Referring now in more detail to the drawings in which like parts have like identifiers, FIG. 1 illustrates in perspective view a tool 10 that holds a plastic member 12 for butt welding to a second plastic member while reducing the waste plastic on an exterior of a weld joint between the plastic members, according to the present invention. The plastic member 12 is tubular with an exterior profile 14 which defines the cross-sectional shape of the plastic member. The illustrated embodiment of the plastic member 12 is merely representative of the many different variations which are commercially available.

The tool 10 is substantially C-shaped in cross-sectional view as defined by a side plate 16 from which a lower die set generally 18 (illustrated exploded into parts) and a top member 20 extend laterally. The top member 20 is configured from machined aluminum and attaches to the side plate 16 with a plurality of bolts (not illustrated). An upper die set generally 22 (illustrated exploded into parts) moves between a first position distally spaced from the lower die set 18 and a second position close to the lower die set for holding one of the plastic members 12 therebetween. The illustrated embodiment also includes a middle die set generally 24 (likewise illustrated exploded into parts) adjacent the lower die set 18, for a purpose discussed below.

The lower die set 18 comprises a lower die 26, a plate or body 28, and a skin 30. The lower die or holder 26 is configured from machined aluminum and attaches to the side plate 16 with a plurality of bolts (not illustrated). The lower die 26 defines a profile surface generally 32 that conforms in cross-sectional shape to a lower portion of the exterior profile 14 of the plastic member 12.

The lower die 26 defines a shelf 33 which receives the plate 28. The plate 28 attaches to the lower die 26 for lateral movement relative to the lower die. Open-ended bores 34 extend through the lower die 26 in alignment with threaded bores 36 in the plate 28. Threaded bolts 37 pass through the bores 34, and engage respective ones of the threaded bores 36 for attaching the plate 28 to the lower die 26. A countersunk bore 38 is defined in an interior face of the plate 28 coaxially with each of the bores 36 (one of which is illustrated). Each bore 38 receives a spring 40. The bolts 37 pass through the springs 40 which bias the plate 28 to a first position distally spaced from the lower die 26. During the welding process as discussed below, the plate 28 moves laterally towards the lower die 26 to a second position, for a purpose discussed below. The skin 30 attaches to the plate 28 to define an exterior face for the tool 10. The skin 30 is preferably heat resistant. In a preferred embodiment, the skin 30 is polytetrafluoroethylene, or TEFLON brand material.

A pair of spaced-apart elongate guides 42 connect to the lower die 26 and the top member 20. In the illustrated embodiment, the guides 42 are cylindrical rods.

The illustrated embodiment includes the middle die set 24 which comprises a middle die or holder 43, a middle plate or body 45, and a skin 47. The middle die set 24 is provided in order to accommodate members 12 that have the laterally extending flange 50. The middle die 43 defines bores 49 through which the guides 42 extend. A side face of the middle die 43 conforms to the side of the profile 14. The middle die set 24 sits on a ledge 46 on the upper surface of the lower die 26. The middle die 43 extends outwardly beyond the ledge 46 over the surface of the lower die 26. The overlapping surface of the middle die 43, the ledge 46, and a portion of the surface 32, cooperatively define a slot 48 for receiving the flange 50 on the exterior profile of the plastic member 12. To facilitate insertion of the plastic member 12 into the lower die 18, the middle die 43 floats relative to the lower die 26 on a spring 52 received in a well 54 in the lower die. An alternate embodiment does not include the spring 52. Rather, the middle die 43 moves on the guides 42. It should be appreciated that profile shapes of other plastic members do not require use of the middle die set 24.

The middle die 43 defines a shelf 56 which receives the middle plate 45 illustrated exploded from the tool 10. The middle plate 45 attaches to the middle die 43 for lateral movement relative to the middle die. Open-ended bores 60 extend through the middle die 43 in alignment with a threaded bore 62 and a pair of bores 64 in the middle plate 45. A bolt 66, passes through the bore 60a, and engages the threaded bore 62 for attaching the middle plate 45 to the middle die 43. Pins 68 extend through the bores 60 and 64 and function as guides for directing the lateral movement of the middle plate 45 relative to the middle die 43. A countersunk bore 70 is defined in an interior face of the middle plate 45 coaxially with the bores 60. Each bore 70 receives a spring 72. The bolt 66 and the pins 68 pass through the springs 72 which bias the plate 45 to a first position distally spaced from the middle die 43. During the welding process as discussed below, the middle plate 45 moves laterally between the first position and a second position closer to the middle die 43, for a purpose discussed below. The middle plate 45 is preferably machined aluminum. The skin 47 comprises a heat resistant sheet attached to the middle plate 45. The skin 47 defines a heat resistant surface on which melted vinyl does not stick or adhere. In the illustrated embodiment, the skin 47 is a sheet of polytetrafluoroethylene (PTFE) and is preferably TEFLON brand material.

The upper die or holder set 22 comprises an upper die 80, an upper plate or body 83, and a skin 85. The upper die 80 defines two spaced-apart bores 81 through which the guides 42 extend. The upper die 80 is movable on the guides 42 between a first position against the top member 20 distally spaced from the lower die set 18 and a second position closer to the lower die set for holding one of the members 12 therebetween. The upper die 80 defines a notch 88 with a profile surface that conforms in cross-sectional shape to the exterior profile 14 of an upper and side portions of the plastic member 12. A pneumatic cylinder 90 mounts to the top member 20 and connects to a supply of pressurized air and a controller. A cylinder rod 92 operatively driven by the cylinder 90 connects to the upper die 80. In the illustrated embodiment, ledge 94 extend laterally from the face of the upper die 80, which ledges conform to the profile 14 of the member 12.

The upper plate 83 attaches to the upper die 80 for lateral movement from a first position distally spaced relative to the upper die and a second position closely spaced thereto. The plate 83 defines a notch 96 which conforms in cross-sectional shape to the upper and side portions of the exterior profile 14 of the plastic member 12. Open-ended bores 100 extend through the upper die 80. Two of the bores 100 align with a pair of spaced-apart threaded bores 102 in the plate 83. A countersunk well 104 is defined coaxially with the bores 102. The wells 104 each receive a spring 106 on a bolt 108 that extends through the bores 100 and 102. Bolts 108 connect the plate 83 to the upper die 80. The springs 106 bias the plate 83 laterally to the first position spaced apart from the upper die 80, for a purpose discussed below. Other bores 100 align with the bores 110 in the plate 83. Pins 112 pass through the bore 100 and 110 and function as guide pins for the lateral travel of the plate 83 between the first position and the second position relative to the upper die 80. The plate 83 is preferably machined aluminum. In the illustrated embodiment, the heat resistant skin 85 attaches to the plate 83. The skin 85 is preferably a sheet of PTFE. The skin 85 defines a notch 115 which conforms to the cross-sectional profile 14 of the member 12. The skin 85 attaches to the plate 83 with a plurality of screws (not illustrated).

Figure 2:
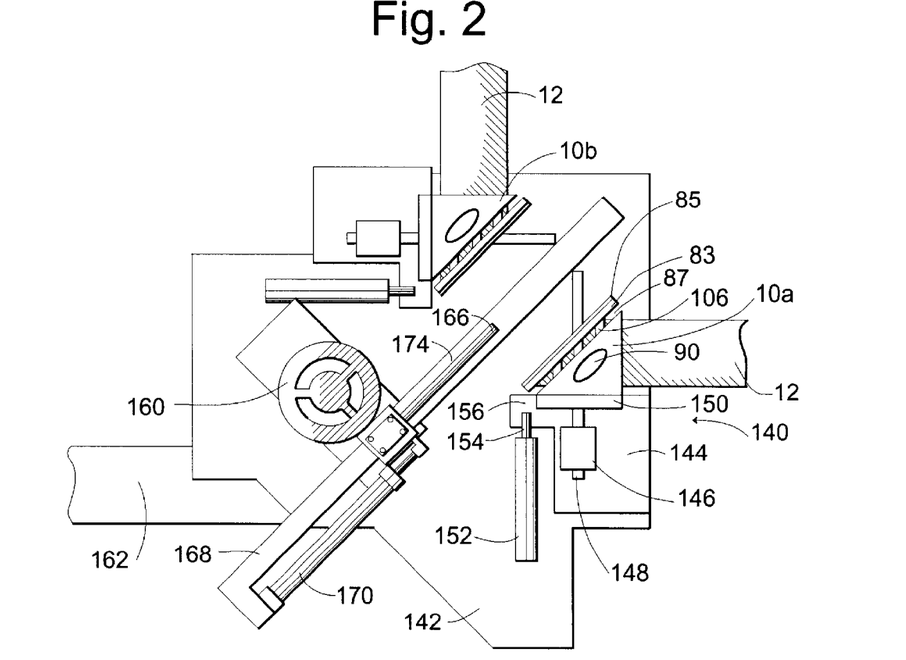
FIG. 2 is a top plan view of an apparatus which uses two of the tools illustrated in FIG. 1 for butt welding a pair of plastic members while reducing the waste plastic on an exterior of a weld joint between the plastic members, according to the present invention.

FIG. 2 is a top plan view of an apparatus 140 which uses two of the tools 10 illustrated in FIG. 1 for butt welding a pair of the plastic members 12 while reducing the waste plastic on an exterior of a weld joint between the plastic members, according to the present invention. The apparatus 140 includes a base 142 that supports a pair of the tools 10 which move together to form a weld joint between members 12 held in the tools as discussed below. The following description of the support and movement structure for tool 10a also relates to that structure for tool 10b. A slide plate 144 connects by a bearing block 146 to a rail 148. A tool support 150 attaches to one end of the slide plate 144. The tool 10 mounts to the support 150 in a conventional manner, such as with magnetic pins and sockets, bolts, or the like. A pneumatic cylinder 152 attaches the base plate 142. A piston 154 extends from the cylinder 152 and connects to a lateral portion 156 of the slide plate 144. The slide plate 144 is movable along the rail 148 from a first position in which the tool 10a is distally spaced from the tool 10b and a second position whereby the tools 10a and 10b are brought into bearing contact with one another, as discussed below. Also illustrated is a motor 160 which communicates through a drive gear (not shown) with a rail 162 for moving the apparatus 142 longitudinally along the rail 162. Such structure is conventional for two and four-head welding machines for accommodating various lengths of members 12 in the frames. A heat plate 166 attaches to a heat plate frame 168. A pneumatic cylinder 170 operatively connects to the heat plate frame 168. The frame connects through a bearing block 172 to a track 174 for longitudinal movement therewith.

The tools 10a and 10b are used to butt weld a pair of the plastic members 12. The pneumatic cylinder 90 is operated to retract the upper die set 22 along the guides 42 away from the lower die set 18, thereby opening a gap as illustrated in FIG. 1 for receiving one of the elongate plastic members 12. In the illustrated embodiment, the member 12 includes the flange 50. To facilitate insertion of the member 12 into the die, the middle die set 24 floats on the spring 52 relative to the lower die set 18, whereby the flange 50 of the member 12 slides through the slot 48. An index plate (not illustrated) is then disposed between the faces of the tools 10a and 10b. The pneumatic cylinder 152 operates to drive the tool 10a and 10b on the rails 148 to the index plate with the skins 30, 47, and 85 in contact with the index plate. The distal edge of the member 12 is moved into contact with the index plate to align the distal end with the face of the tool 10 defined by the skins 30, 47, and 85 of the die sets 18, 24, and 22, respectively. The pneumatic cylinder 90 is then operated to move the upper die set 22 vertically on the guides 42 into bearing contact with the member 12 to secure the member in the tool. The profile surfaces 32 and 88 closely conform to the exterior profile of the member 12 which is received between the die sets 18, 22, and 24 (which defines a side portion of the profile 14). The tools 10a and 10b are retracted by the pneumatic cylinders 152. The index plate is retracted.

Figure 3:
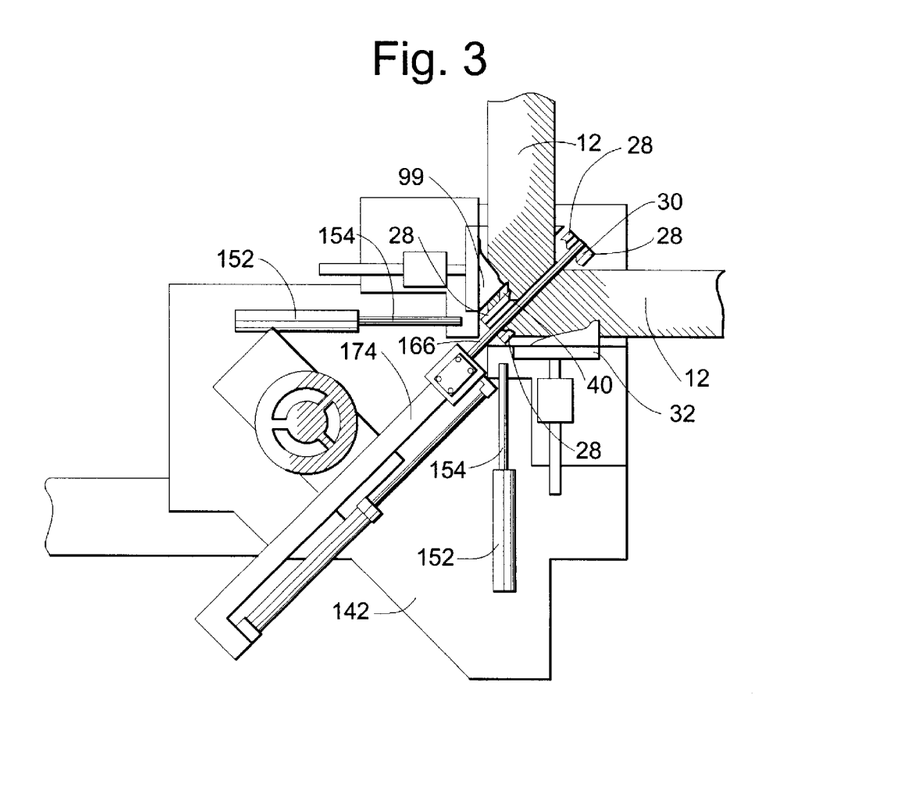
FIG. 3 is a partially cut-away top plan view of the apparatus illustrated in FIG. 2 showing the heating step for butt welding a pair of plastic members with a gap defined between movable plates and respective dies, which plates and dies are spaced-apart by springs.

With reference to FIG. 3, the pneumatic cylinder 170 is operated to move the heat plate 166 from its first position retracted from the tools 10 to the second position between the tools 10. The tools 10a and 10b are moved into bearing contact with the heat plate 166. The pneumatic cylinders 152 continue to drive the tools 10a and 10b together bringing the distal ends of the members 12 into contact with the heat plate 166. The heat plate 166 rapidly warms and melts the vinyl at the distal end portion of the respected members 12. The pneumatic cylinders 152 continue driving the tools 10 together. The plates 28, 45, and 83 of the die sets move laterally from the first position to the second position towards the respective dies 26, 43, and 80. In doing so, the skins 30, 47, and 85 seal the exterior profile of the members 12 from the flow of melted plastic which can only flow inwardly of the members.

Figure 4:
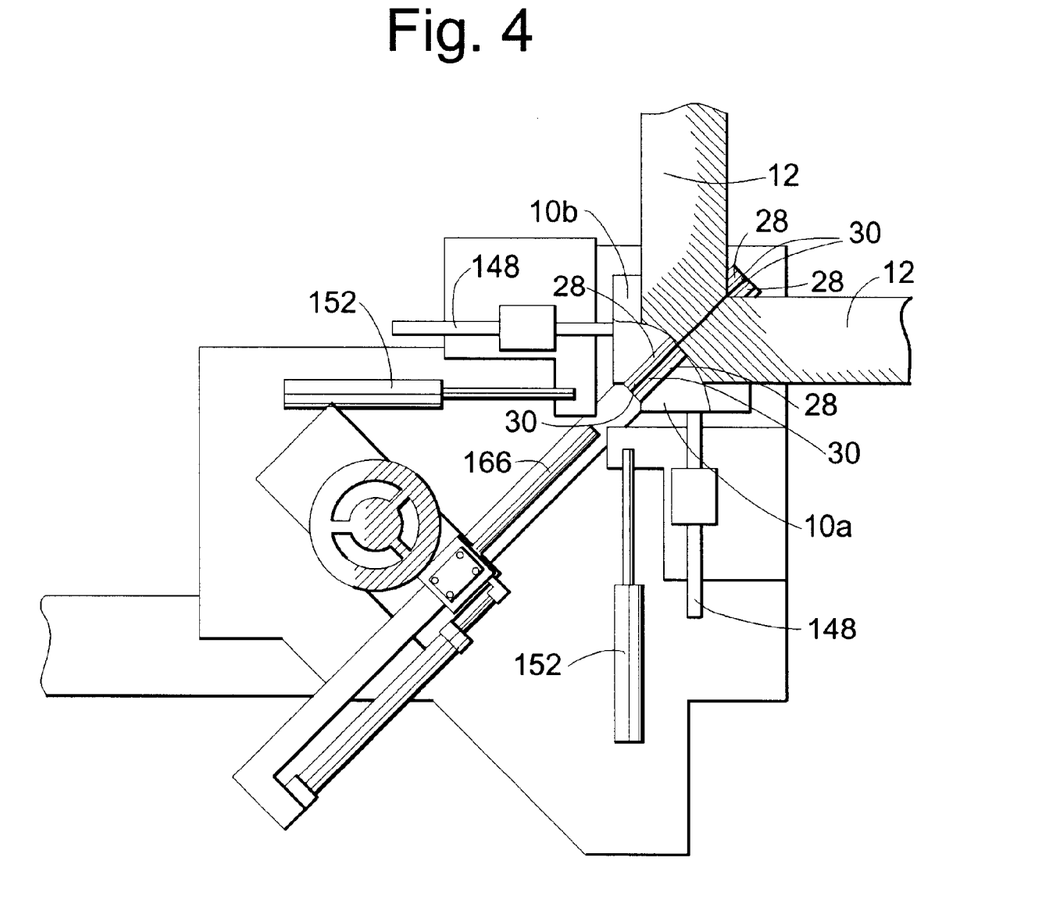
FIG. 4 is a partially cut-away plan view of the apparatus illustrated in FIG. 2 showing the pair of plastic members butt welded together while the plates have moved against the dies closing the gap therebetween.

With reference to FIG. 4, after the desired amount of meltback occurs, the tools 10a and 10b retract by action of the cylinder 152. The plates 28, 45, and 83 move laterally outwardly to the first position. The heat plate 166 retracts. The pneumatic cylinders 152 then move the tools 10a and 10b forcibly together. The skins 30, 47, and 85 cooperatively seal the exterior of the members 12 around the molten distal ends which engage together, compressingly, and fuse together to form the welded joint. The plates 28, 45, and 83 of the die sets 18, 24, and 22, respectively, move from the first position to the second position to maintain the seal around the joint being formed between the distal ends of the members 12. This seal prevents the waste flow of plastic outwardly of the joint. The waste flow accumulates on the interior of the weld joint, thereby strengthening it. In an alternate embodiment (not illustrated), pneumatic cylinders press cylinder rods through the bores 34, 36; 60, 62; and 100, 110; for biasing the plates laterally of the dies. The force of the cylinders 152 on the tools 10 force the plates laterally to the second position.

Figure 5:
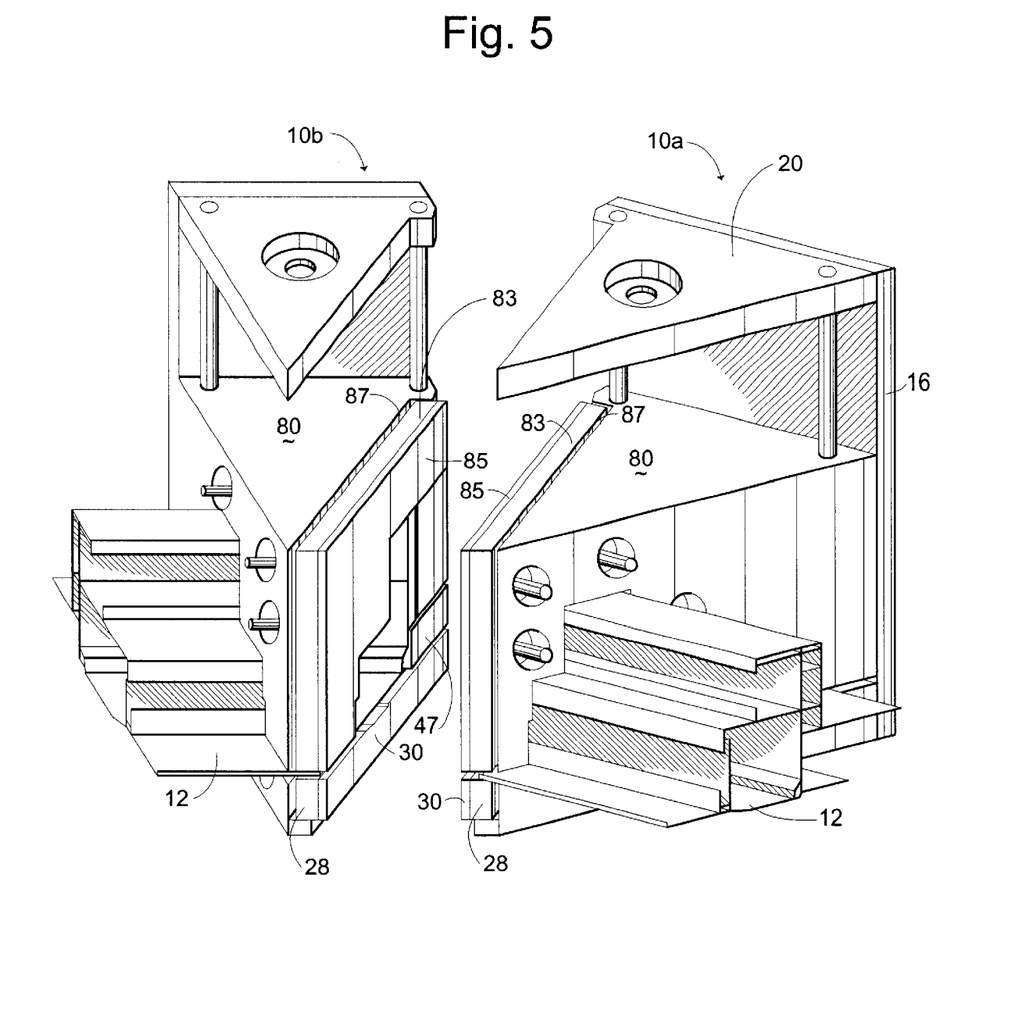
FIG. 5 is a perspective view of a pair of the tools illustrated in FIG. 1, spaced-apart with frame members for butt welding during operation of the apparatus according to the present invention and particularly illustrating a gap defined between the movable plates nad respective dies.
Figure 6:
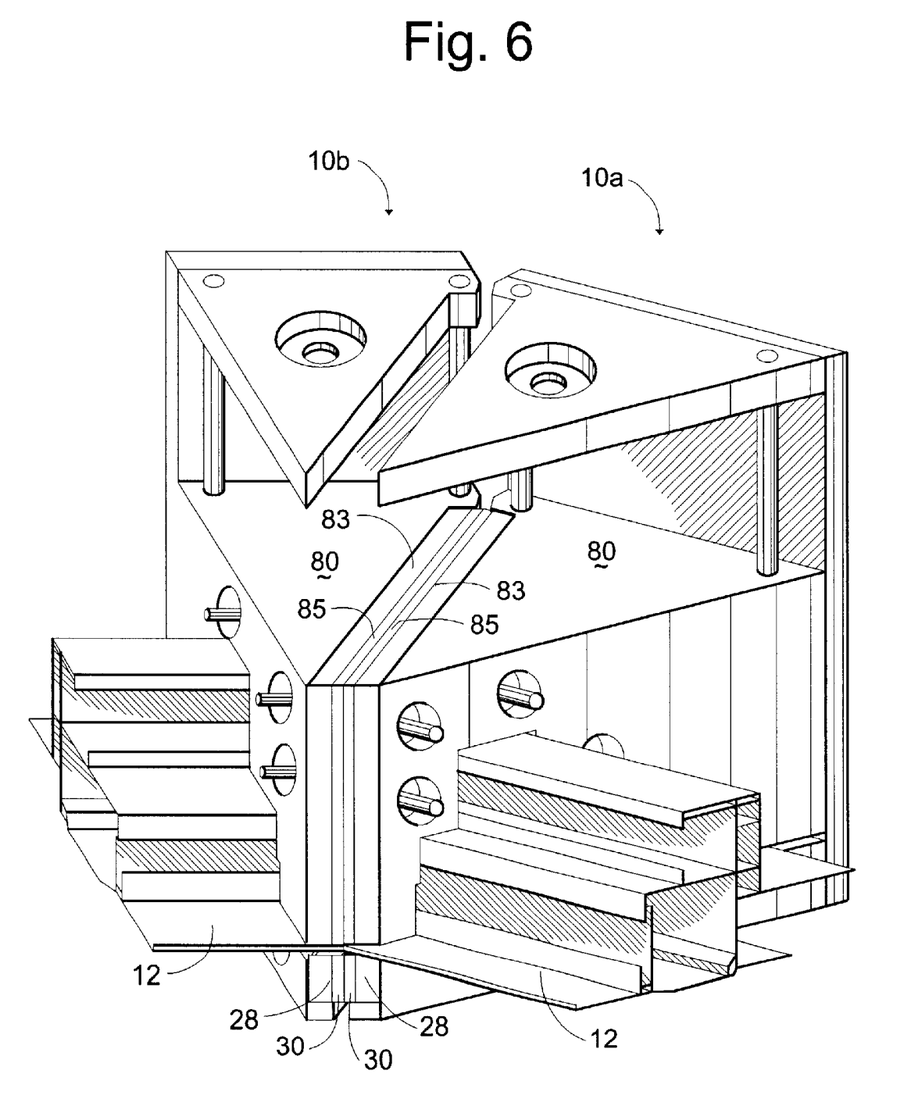
FIG. 6 is a perspective view of the pair of the tools illustrated in FIG. 5, to illustrate details of the pair of plastic members butt welded together while the plates have moved against the dies closing the gap therebetween.

The movement of the plates 28, 45, and 83 relative to the movement of the tool 10 is illustrated in FIGS. 5 and 6. FIG. 5 is a perspective view of a pair of the tools 10a, 10b illustrated in FIG. 1. The tools 10a, 10b are spaced-apart with frame members 12 for butt welding during operation of the apparatus 140 as discussed above. As illustrated, the plates 28 and 83 (and plate 45 not illustrated) are biased outwardly to define a gap 87 between the movable plates and their respective dies. During the heating and welding steps, the plates 28, 45, and 83 move to the second positions and thereby close the gap 87, as illustrated in FIG. 6. FIG. 6 is a perspective view of the pair of the tools 10a, 10b illustrated in FIG. 5, with the pair of plastic members 12 butt welded together while the plates 28 and 83 (plate 45 not illustrated) have moved against the dies and thereby closing the gap 87 therebetween. In accordance with the present invention, the tools 10a, 10b move together in first opposing directions and the plates move in second directions from their first outwardly biased positions to the second retracted positions, thereby maintaining the seal on the exterior profile of the plastic members 12 during the heating and welding steps of the process according to the present invention.

Shortly, the weld sets to rigidly connect the members 12 together. The cylinders 90 are thereby operated to move the upper die set 22 away from the lower die set 18, enabling the joined members 12 to be removed from the apparatus 140. The cylinders 152 are then actuated to retract the tools 10a and 10b apart relatively to the second position for insertion of new members 12 for being welded together.

The present invention further provides low heat-conductive skins 30, 47, and 85 on the plates 28, 45, and 83, which skins contact the heat plate 166 during the welding process. The low heat-conductive material allows the heat plate 166 to heat the distal end of the members 12 without undue cooling. It is to be appreciated that in an alternate embodiment, the plates 28, 45, and 83 are formed of blocks of a rigid, low heat-conductive material such as PTFE, which provides a smooth skin for bearing against the heat plate 166. Such embodiment does not have the separate skins 30, 47, and 85.

It is thus seen that an improved tool is provided for butt welding plastic members for window frames and the like. While this invention has been described in detail with particular reference to the preferred embodiments thereof, the principles and modes of operation of the present invention have been described in the foregoing specification. The invention is not to be construed as limited to the particular forms disclosed because these are regarded as illustrative rather than restrictive. Moreover, modifications, variations and changes may be made by those skilled in the art without departure from the spirit and scope of the invention as described by the following claims.

What is claimed is:

1. A method of butt welding aligned ends of a pair of plastic member with reduced waste material on the exterior surface of the joint formed between the plastic members, comprising the steps of:
   (a) placing a pair of plastic members in respective tools which each have opposing lower and upper dies that define opposing profile surfaces that conform to an exterior cross-sectional profile of the plastic member received and held therebetween, the tools further including opposing lower and upper plates disposed in spaced-apart relation to the lower die and the upper die, respectively, and movable mount means connecting the lower plate to the lower die and the upper plate to the upper die independently for lateral movement of the plates relative to the dies between a first distally spaced position to a second closely spaced position, the plates having opposing surfaces that conform to the exterior cross-sectional member of the plastic member for being received therebetween, the distal ends of the members being aligned with an exterior face of the respective plates;
   (b) moving a heat blade between the pair of tools;
   (c) moving the tools against the sides of the heat blade for melting the distal ends of the plastic members in contact therewith;
   (d) sealing the exterior of the plastic members from flow of molten plastic by moving the plates in contact with the heat blade laterally towards the dies from the first position to the second position as the distal ends of the aligned plastic members melt;
   (e) moving the tools away from the heat blade to take the plates out of contact therewith, with the plates moving from the second position to the first position relative to the respective dies to maintain the seal against flow of molten plastic to the exterior of the plastic members;
   (f) retracting the heat blade from between the pair of tools;
   (g) moving the tools together forcibly to move the plates laterally to the second position for compressingly fusing the melted distal ends of the plastic members together,
   whereby the plates move between the first and the second positions to seal between the heat plate and the profile from exterior flow of the melted plastic material which flows inwardly of the joint.

2. The method as recited in claim 1, further comprising the steps of:
   (h) moving the tools apart during which the plates move laterally from the second position to the first position; and
   (i) moving the upper die from the second position to the first position for removing the welded-together plastic members.

3. A method for welding a first plastic member for welding to a second plastic member with reduced waste material on the exterior surface of the joint formed between the plastic members, comprising the steps of:
   (a) holding a first plastic member in a first die and a second plastic member in a opposing second die, the first and the second dies each having a movable plate conforming in cross-section to the exterior profile of the respective first and second plastic members;
   (b) heating a respective distal end of the first and the second plastic members to form molten plastic material in respective distal end portions;
   (c) moving the first and the second die in respective first directions towards each other with the plates in bearing contact so as to weldingly engage the heated distal ends of the first and second plastic members, while the plates move in a respective second directions from a first position extended away from the respective first and second dies to a second position closer to the respective first and second dies, whereby the plates, in sealing contact with each other, seal molten plastic material from flowing outwardly of the joint being formed during the welding process.

4. The method as recited in claim 3, wherein the step (b) comprises the steps of:

moving a heater to a heating position between the respective distal ends of the first and the second members;

bearing the distal ends of the first and the second members against the heater, until the distal ends of the first and second members become at least partially molten; and removing the heater from between the first and the second members.

5. The method as recited in claim 4, wherein the step of bearing the distal ends against the heater comprises the step of moving the first and the second dies in respective first directions towards each other to bring the distal ends of the plastic members into contact with the heater.

6. The method as recited in claim 3, further comprising the step of in step (a) of biasing the plates outwardly from the respective first and second dies.

7. The method as recited in claim 3, further comprising the step prior to step (a) of moving a first portion of each of the first and the second dies apart from respective second portions for receiving the first and the second plastic members in the dies.

8. The method as recited in claim 7, further comprising the step of (d) moving the first portion of each of the first and the second dies apart from respective second portions for removing the welded plastic members from the dies.

* * * * *